United States Patent [19]

Haaf et al.

[11] 4,191,685
[45] Mar. 4, 1980

[54] COMPOSITION OF POLYPHENYLENE ETHER, AROMATIC PHOSPHATE, AROMATIC HALOGEN COMPOUND AND IMPACT MODIFIER COMPRISING DIENE POLYMER

[75] Inventors: William R. Haaf, Voorheesville; Gim F. Lee, Jr., Albany, both of N.Y.

[73] Assignee: General Electric Company, Pittsfield, Mass.

[21] Appl. No.: 838,861

[22] Filed: Oct. 3, 1977

[51] Int. Cl.$^2$ .......................... C08K 5/02; C08K 5/13; C08L 53/02
[52] U.S. Cl. .................. 260/45.95 G; 260/45.7 P; 525/95; 525/394
[58] Field of Search ............... 260/876 B, 874, 45.7 P, 260/45.95 G

[56] References Cited

U.S. PATENT DOCUMENTS

| | | | |
|---|---|---|---|
| 2,857,360 | 10/1958 | Feuer | 260/879 |
| 2,943,074 | 6/1960 | Feuer | 260/879 |
| 3,231,635 | 1/1966 | Holden | 260/880 |
| 3,251,905 | 5/1966 | Zelinski | 260/879 |
| 3,257,357 | 6/1966 | Stamatoff | 260/47 |
| 3,257,358 | 6/1966 | Stamatoff | 260/47 |
| 3,281,383 | 10/1966 | Zelinski | 260/47 |
| 3,306,874 | 2/1967 | Hay | 260/47 |
| 3,306,875 | 2/1967 | Hay | 260/47 |
| 3,341,625 | 9/1967 | Currier et al. | 260/45.7 P |
| 3,383,435 | 8/1967 | Ozek | 260/874 |
| 3,431,323 | 3/1964 | Jones | 260/880 B |
| 3,639,506 | 2/1972 | Haaf | 260/887 |
| 3,639,508 | 2/1972 | Kambour | 260/876 |
| 3,670,054 | 6/1972 | De-LaMare | 260/880 |
| 3,960,808 | 6/1976 | Katchman | 260/876 |

OTHER PUBLICATIONS

Kennedy, et al., "Polymer Chemistry of Synthetic Elastomers", Interscience Publishers, vol. 23, Part II, pp. 553–559 (1969).

Primary Examiner—J. Ziegler
Attorney, Agent, or Firm—Morgan, Finnegan, Pine, Foley & Lee

[57] ABSTRACT

Compositions comprising a polyphenylene ether and, optionally, a styrene resin, an aromatic phosphate, phosphonate or phosphine oxide, an aromatic halogen compound and an impact modifier comprising a diene polymer have excellent flame retardant properties during large scale flammability tests. The compositions will tolerate large amounts of aromatic halogen compound without discoloration and processing difficulties. In comparison with compositions of the present state of the art, peak burn temperatures are reduced, smoke is less dense, and flaming drips are eliminated in large as well as small scale burn tests.

17 Claims, No Drawings

COMPOSITION OF POLYPHENYLENE ETHER, AROMATIC PHOSPHATE, AROMATIC HALOGEN COMPOUND AND IMPACT MODIFIER COMPRISING DIENE POLYMER

This invention relates to thermoplastic compositions and more particularly, to polyphenylene ethers in combination with an aromatic phosphate, phosphonate or phosphine oxide, an aromatic halogen compound and an impact modifier comprising a polymerized diene compound.

BACKGROUND OF THE INVENTION

Compositions of polyphenylene ether resins are useful in molding, extrusions and the like. Such resins have repeating structural units conforming to the formula:

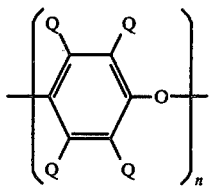

wherein the oxygen ether atom of one unit is connected to the benzene nucleus of the next adjoining unit; n is a positive integer equal to at least 50; and each of Q and Q is a monovalent substituent selected from hydrogen, halogen, hydrocarbon radicals free of a tertiary-alpha-carbon atom, halohydrocarbon radicals having at least two carbon atoms between the halogen atom and phenol nucleus and being free of a tertiary-alpha-carbon atom, hydrocarbonoxy radicals being free of a tertiary-alpha-carbon atom, and halohydrocarbonoxy radicals having at least two carbon atoms between the halogen atoms and phenyl nucleus and being free of tertiary-alpha-carbon atom. Examples of polyphenylene ethers conforming to the formula and methods for their preparation may be found in Hay, U.S. Pat. Nos. 3,306,874 and 3,306,875, and Stamatoff, U.S. Pat. Nos. 3,257,357 and 3,257,358, each of which is incorporated herein by reference. Compositions comprising polyphenylene ether resins and styrene resins, including styrene/butadiene graft and random copolymers, are disclosed in Cizek, U.S. Pat. No. 3,383,435, which is also incorporated herein by reference.

It is well known in the art that plastic compositions may be rendered flame retardant by the addition of various chemicals known as "flame retardants." Flame retardants can be divided into two types: (1) additives which are blended physically with the material and (2) modifiers which are reactive and unite chemically with the plastic. The former include most organic phosphate esters, halogenated hydrocarbons such as chlorinated waxes, antimony oxide, and inorganic salts. The latter group (2) includes chlorendic acid and its derivatives, halogenated phthalic anhydride, phosphorus and halogen-containing polyols, and halogenated phenols. It should be noted, however, that improving flame retardancy is not simply a matter of adding chemicals. Combining flame retardant additives with various polymers not only affects burning characteristics, it frequently changes the color, flexibility, tensile strength, electrical properties, softening point, and moldability characteristics of the plastic. Obtaining adequate flame retardant properties usually requires loading the plastic with a high concentration of flame retardant.

Prior art flame retardants, such as those noted above, have been added to blends of the polyphenylene ethers, alone, and in combination with styrene resins with some or even substantial improvement in flame retardant properties. For example, aromatic phosphates such as triphenyl phosphates have been added to compositions comprising polyphenylene ether resins with flame retardant properties being improved to the point where they may be classified as self-extinguishing and non-dripping according to the small-scale tests, such as ASTM test method D 635 and Underwriters' Laboratory Bulletin No. 94. However, triphenyl phosphate is a plasticizer for the polyphenylene ether resin and its addition even in the small amounts necessary for flame retardancy, results in a substantial decrease in heat distortion temperature to a point where the commercial use is substantially impaired. Other aromatic phosphates behave in similar manner. Aromatic halogen compounds also have been compounded into polyphenylene ether resins but their addition in commercially feasible quantities generally does not result in satisfactory flame retardant properties, because high loadings lead to discoloration because of processing difficulties.

Haaf, U.S. Pat. No. 3,639,506, incorporated herein by reference discloses that the addition of a small but effective quantity of a flame retardant combination of an aromatic phosphate and an aromatic halogen compound to a composition comprising a polyphenylene ether substantially improves flame retardant properties without depressing heat distortion temperature of the polymer to a point where its commercial use is substantially impaired.

Recently, industry-wide interest in the performance of materials under real-life fire conditions has become increasingly apparent. In contrast to small-scale fire-test performance (e.g., ASTM and Underwriters' Bulletin No. 94), large-scale tests are concerned with parameters such as evaluation of the extent of burning, the heat involved during combustion, smoke characteristics, and the nature of the composition products liberated.

It has now been discovered that a combination of (a) a polyphenylene ether resin, (b) an aromatic phosphate, an aromatic phosphonate or an aromatic phosphine oxide, (c) an aromatic halogen compound and (d) an elastomeric impact modifier comprising a polymerized diene rubber compound performs unexpectedly well during large scale flammability tests, such as the Brady-Williamson Corner Test.

The new combination is uniquely advantageous because (i) it is possible to incorporate a large amount—10 parts by weight, or so—of a brominated fire-retardant additive without causing discoloration or processing difficulties; (ii) peak burning temperatures are low, smoke densities are low and burning, dripping tendencies are reduced; and (iii) large scale and small scale test results are good whereas known compositions with good small test results, fail the large scale tests.

DESCRIPTION OF THE INVENTION

According to this invention there are provided flame retardant, impact resistant compositions comprising:
 (a) a polyphenylene ether resin;
 (b) an aromatic phosphate, an aromatic phosphonate or an aromatic phosphine oxide compound;
 (c) an aromatic halogen compound; and (d) an impact modifier comprising an elastomeric grafted, blended or copolymerized diene compound, components (b) and (c) being present in an amount at least sufficient to render said composition flame retardant, and component (d) being present in an amount at least sufficient to improve the impact resistance of articles molded from said composition.

The polyphenylene ether component (a) of the combination has been described above, and preferably comprises 50 to 95 parts by weight per 100 parts of the composition.

The aromatic phosphate component (b) of the combination would include, but not be limited to those triesters of the type:

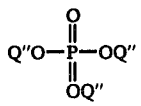

where each Q" represents the same or different radicals including hydrocarbon radicals such as alkyl, cycloalkyl, aryl, alkyl substituted aryl and aryl substituted alkyl; halogen; hydrogen and combinations thereof provided that at least one of said R's is aryl. Typical examples of suitable phosphates include, phenylbisdodecyl phosphate, phenylbisneopentyl phosphate, phenylethylene hydrogen phosphate, phenyl-bis(3,5,5'-trimethylhexyl phosphate), ethyldiphenyl phosphate, 2-etyyl-hexyl di(p-tolyl) phosphate, di-phenyl hydrogen phosphate, bis(2-ethylhexyl) p-tolylphosphate, tritolyl phosphate, bis(2-ethylhexyl)phenyl phosphate, tri(nonylphenyl)phosphate, phenylmethyl hydrogen phosphate, di(dodecyl) p-tolyl phosphate, tricresyl phosphate, triphenyl phosphate, dibutylphenyl phosphate, 2-chloroethyldiphenyl phosphate, p-tolyl bis(2,5,5-trimethylhexyl) phosphate, 2-ethylhexyldiphenyl phosphate, diphenyl hydrogen phosphate, etc. The preferred phosphates are those where each R is aryl. The most preferred phosphate is triphenyl phosphate. The preferred aromatic phosphonate is diphenyl phenyl phosphonate; and the preferred aromatic phosphine oxide is triphenyl phosphine oxide.

The aromatic halogen component (c) of the flame retardant combination preferably conforms to the formula:

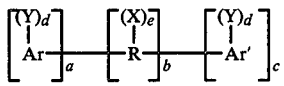

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, etc.; a linkage selected from the group consisting of ether oxygen ether; carbonyl; amine; a sulfur containing linkage, e.g., sulfide, sulfoxide, sulfone; a phosphorus containing linkage; etc. R can also consist of two or more alkylene or alkylidene linkages connected by such groups as aromatic, amino, ether, carbonyl, sulfide, sulfoxide, sulfone, a phosphorus containing linkage, etc. Other groups which are represented by R will occur to those skilled in the art.

Ar and Ar' are mono- or polycarbocyclic aromatic groups such as phenylene, biphenylene, terphenylene, naphthylene, etc. Ar and Ar' may be the same or different.

Y is a substituent selected from the group consisting of organic, inorganic or organometallic radicals. The substituents represented by Y include (1) halogen, e.g., chlorine, bromine, iodine fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl nucleus.

X is a monovalent hydrocarbon group exemplified by the following: alkyl, such as methyl, ethyl, propyl, isopropyl, butyl, decyl, etc; aryl groups, such as phenyl, naphthyl, biphenyl, xylyl, tolyl, etc; aralkyl groups such as benzyl, ethylphenyl, etc.; cycloaliphatic groups, such as cyclopentyl, cyclohexyl, etc.; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are biphenols of which the following are representative:
2,2-bis-(3,5-dichlorophenyl)-propane
bis-(2-chlorophenyl)-methane
bis(2,6-dibromophenyl)-methane
1,1-bis-(4-iodophenyl)-ethane
1,2-bis-(2,6-dichlorophenyl)-ethane
1,1-bis-(2-chloro-4-iodophenyl)ethane
1,1-bis-(2-chloro-4-methylphenyl)-ethane
1,1-bis-(3,5-dichlorophenyl)-ethane
2,2-bis-(3-phenyl-4-bromophenyl)-ethane
2,6-bis-(4,6-dichloronaphthyl)-propane
2,2-bis-(2,6-dichlorophenyl)-pentane
2,2-bis-(3,5-dichromophenyl)-hexane
bis-(4-chlorophenyl)-phenyl-methane
bis-(3,5-dichlorophenyl)-cyclohexylmethane
bis-(3-nitro-4-bromophenyl)-methane
bis-(4-hydroxy-2,6-dichloro-3-methoxyphenyl)-methane
2,2-bis-(3,5-dichloro-4-hydroxyphenyl)-propane
2,2bis-(3-bromo-4-hydroxyphenyl)-propane The preparation of these and other applicable bisphenols is known in the art. They are most commonly prepared by condensation of two moles of a phenol with a single mole of a ketone or aldehyde. In place of the divalent aliphatic group in the above examples may be substituted oxygen, sulfur sulfoxy, etc.

Included within the above structural formula are: 1,3-dichlorobenzene, 1,4-dibrombenzene, 1,3-dichloro-4-hydroxybenzene and biphenyls such as 2,2'-dichlorobiphenyl, 2,4'-dibromobiphenyl, and 2,4'- dichlorobiphenyl as well as decabromo modiphenyl oxide, and the like.

Also useful as component (c) are oligomeric and polymeric halogenated aromatic compounds, such as, for example, a copolycarbonate of bisphenol A and tetrabromobisphenol A and a carbonate precursor, e.g., phosgene.

The impact modifier component (d) can comprise any one of a number of elastomeric polymerized diene blends, and copolymers comprising grafts, block, radial, etc., structures known in this art under the general term "resin impact modifiers". Illustratively, they will comprise a compound selected from (i) an A-B-A block copolymer wherein terminal blocks A comprise a polymerized vinyl aromatic compound and center blocks B comprise a polymerized diene hydrocarbon, or a hydrogenated derivative thereof;

(ii) a radial teleblock copolymer comprising polymerized vinyl aromatic blocks and polymerized diene hydrocarbon blocks, or a hydrogenated derivative thereof;

(iii) an A-B block copolymer wherein block A comprises a polymerized vinyl aromatic compound and block B comprises a polymerized diene hydrocarbon, or a hydrogenated derivative thereof;

(iv) a rubber modified styrene resin comprising at least 20 parts by weight of a polymerized diene hydrocarbon and graft polymerized vinyl aromatic compound, or a hydrogenated derivative thereof; and (v) a graft copolymer of an acrylic ester, alone, or in combination with a vinyl aromatic compound and a polymerized diene hydrocarbon, or a halogenated derivative thereof.

The A-B-A block copolymers of vinyl aromatic hydrocarbon and a diene hydrocarbon (b) (i) are well known in the art and commercially available. These are described, for instance, in "Polymer Chemistry of Synthetic Elastomers", edited by Kennedy et al, Interscience Publishers, Vol. 23, Part II (1969), pages 553–559, the disclosure of which is incorporated herein by reference. Other descriptions given in Zelinski, U.S. Pat. No. 3,251,905 and Holden et al, U.S. Pat. No. 3,231,635 which are also incorporated herein by reference.

In general, component (b) (i) is a block copolymer of A-B-A type in which terminal blocks A, which can be the same or different, are thermoplastic homopolymers or polymers prepared from a vinyl aromatic compound wherein true aromatic moiety can be either mono- or polycyclic. Examples include styrene, alpha-methyl styrene, vinyl toluene, vinyl xylene, ethyl vinyl xylene, vinyl naphthalene and the like, or mixtures thereof.

Center blocks B is an elastomeric polymer derived from a diene hydrocarbon, preferably a conjugated diene, e.g., 1,3-butadiene, 2,3-dimethyl butadiene, isoprene, 1,3-pentadiene and the like, or mixtures thereof.

The ratio of the copolymers and the average molecular weights of each can vary broadly. Preferably, however, the molecular weight of center Block B will be greater than that of the combined terminal blocks, which appear to be necessary for optimum impact strength and solvent resistance. The molecular weight of terminal blocks A will preferably range from about 2,000 to about 100,000, while the molecular weight of center blocks B is preferably from about 25,000 to about 1,000,000.

If desired, the block polymers can be post-treated to hydrogenate the rubber portion of the polymer.

Hydrogenation can be carried out with a variety of hydrogenation catalysts, such as nickel on Kieselguhr, Ranez nickel, copper chromate, molybdiene sulfate and finely divided platinum or other noble metals on a low sulfate area catalyst.

Hydrogenation can be conducted at any desired temperature or pressure, e.g., from atmospheric to 3,000 p.s.i.g., usually between 100 and 1,000 p.s.i.g., and at temperatures between 75° to 600° F., for times ranging between 0.1 and 24 hours, preferably from 0.2 to 8 hrs.

With respect to the hydrogenated A-B-A block copolymers, it is preferred to form terminal blocks A having average molecular weights of from about 4,000 to about 115,000 and center blocks B having an average molecular weight of from about 20,000 to about 450,000. Still more preferably, the terminal blocks A will have an average molecular weight of from 8,000 to 60,000 while center blocks B will have an average molecular weight of from 5,000 to 300,000.

The terminal blocks will also preferably comprise from 2 to 33% by weight, more preferably from 5 to 30% by weight, based on the total weight of the blocks copolymer. Especially preferred hydrogenated block copolymers are those having a polybutadiene center block wherein from 35 to 55%, more preferably from 40 to 50% of the butadiene carbon atoms are vinyl side chains.

The hydrogenated block polymers are described further in Jones, U.S. Pat. No. 3,431,323 and De LaMare, et al, U.S. Pat. No. 3,670,054, both of which are incorporated herein by reference.

In preferred compositions, component (d)(i) comprises an A-B-A block copolymer of polystrene-polybutadiene-polystyrene or polystyrene-polyisoprene-polystyrene type wherein the polybutadiene or polyisoprene portion can be either hydrogenated or non-hydrogenated.

The radial teleblock copolymers can be made by means known in this art and they are also commercially available. As an illustration, they can be made by polymerizing conjugated dienes, e.g., butadiene, and vinyl aromatic compounds, e.g., styrene in the presence of an organometallic initiator, e.g., n-butyllithium, to produce copolymers which contain an active metal atom, such as lithium, on one end of each of the polymer chains. These metal atom-terminated polymers are then reacted with a coupling agent which has at least three active sites capable of reacting with the carbon-metal atom bonds on the polymer chains and replacing the metal atoms on the chains. This results in polymers which have relatively long branches which radiate from a nucleus formed by the polyfunctional coupling agent.

Such a method of preparation is described in detail in Zelinski et al, U.S. Pat. No. 3,281,383, which is incorporated herein by reference.

The coupling agents for the teleblock copolymers can be chosen from among polyepoxides, polyisocyanates, polyimines, polyaldehydes, polyketones, polyanhydrides, polyesters, polyhalides and the like. These materials can contain two or more types of functional groups, such as the combination of epoxy and aldehyde groups or isocyanate and halide groups. The coupling agents are described in detail in the above-mentioned U.S. Pat. No. 3,281,383.

The conjugated dienes of the radial teleblock copolymer include compounds such as 1,3-butadiene, isoprene, 2,3-dimethyl-1,3-butadiene, 1,3-pentadiene, 3-butyl-1,3-octadiene, and the like. The vinyl aromatic polymers may be prepared from vinyl aromatic compounds of Formula II. They include styrene, 1-vinylnaphthalene, 2-vinylnaphthalene and the alkyl, cycloalkyl, aryl, alkaryl and aralkyl derivatives thereof. Examples include 3-methylstyrene, 4-n-propylstyrene, 4-cyclohexylstyrene, 4-4-(4-phenyl-n-butyl) styrene, and the like.

In preferred compositions, the radial teleblock copolymer will be a radial teleblock copolymer of styrene and butadiene, with terminal blocks derived from styrene, and a coupling agent selected from epoxidized polybutadiene, $SiCl_4$ or mixtures thereof. Expecially preferred epoxidized polybutadiene coupling agents are available commercially under the trade names Oxiron 2000 and Oxiron 2001.

The molecular weight of the radial teleblock copolymer and the ratios of the co-monomers thereof can vary broadly. In preferred embodiments the molecular weight of the radial teleblock copolymer will be from about 100,000 to about 350,000, and will comprise from 1 to 45 parts by weight of the vinyl aromatic compound and from 99 to 55 parts by weight of the conjugated diene, based on the weight of the radial teleblock copolymer. The amount of coupling agent in the copolymer will depend on the particular agent and the amount of organometallic initiator used. Generally, relatively small amounts of coupling agent, e.g., from about 0.1 to 1 part of weight per 100 parts of resin are employed.

Preferred radial teleblock copolymers are Solprene 406 (containing about 60 parts of weight of butadiene units and about 40 parts by weight of styrene units), Solprene 411 (containing about 70 parts by weight of butadiene units and about 30 parts by weight of styrene units), Solprene 414 (containing about 60 parts by weight of butadiene units and about 40 parts by weight of styrene units), and S411P (containing about 70 parts by weight of butadiene units and about 30 parts by weight of styrene units). These materials also include a relatively minor amount of coupling agent, e.g., less than 1 part by weight of coupling agent per 100 parts of polymer.

The rubber modified styrene resin comprising at least 20 parts by weight of polymerized diene hydrocarbon can be made by means known in this art and they are also commercially available, e.g., from Union Carbide, New York, N.Y. under the trade designation TGD-2100.

The graft copolymers or acrylic ester and diene rubber can be made by means known in the art and they are also commerically available, e.g., from Rohm & Haas Co., Philadephia, Pa., under the trade designation Acryloid KM 611.

The graft polymerization product of an acrylic monomer and a diene rubber preferably comprises (1) from about 20–80% by weight of a backbone polymer of the units of butadiene or butadiene and styrene, wherein the butadiene units are present in quantities of at least 40% by weight of the backbone polymer, (2) 80–20% by weight of an acrylic monomer graft polymerized to (1); said acrylic monomer units being selected from the group consisting of lower alkyl methacrylates, alicyclic methacrylates and alkyl acrylates, and (3) 0 to 60% by weight of a styrene monomer graft polymerized to (1) or (2); sequentially or simultaneously with the polymerization of (2).

The graft polymerization product of an acrylic monomer alone or with styrene monomer and the rubbery diene polymer or copolymer may be prepared by known techniques, typically by emulsion polymerization. They may be formed from a styrenebutadiene copolymer latex and a monomeric material such as methyl methacrylate alone or with another compound having a single vinylidene group copolymerizable therewith, e.g., styrene. For example, in the preparation of a representative material, 85–65 parts by weight of monomeric methyl methacylate or monomeric methyl methacrylate to the extent of at least 55% and preferably as much as 75% by weight in admixture with another monomer which copolymerizes therewith, such as ethyl acrylate, acrylonitrile, vinylidene chloride, styrene, and similar unsaturated compounds containing a single vinylidene group, is added to 15–35 parts by weight of solids in a styrenebutadiene copolymer latex. The copolymer solids in the latex comprise about 10–50% by weight of styrene and about 90–50% by weight of butadiene and the molecular weight thereof is within the range of about 25,000 to 1,500,000. The copolymer latex of solids in water contains a dispersing agent such as sodium oleate or the like to maintain the copolymer in emulsion. Interpolymerization of the monomer or monomeric mixture with the copolymer solids emulsified in water is brought about in the presence of a free-radical generating catalyst and a polymerization regulator which serves as a chain transfer agent, at a temperature of the order of 15° C. to 80° C. Coagulation of the interpolymerized product is then effected with a calcium chloride solution, for instance, whereupon it is filtered, washed and dried. Other graft copolymers and differing from the above only in the ratio of monomeric material solely or preponderantly of methyl methacrylate to the butadiene-styrene copolymer latex in the presence of which it is polymerized extends from 85–25 parts by weight of the former to 15–75 parts by weight of the latter. These materials may extend in physical properties from relatively rigid compositions to rubbery compositions. A preferred commercially available material is Acryloid KM 611 which is sold by Rohm & Haas. Also, U.S. Pat. Nos. 2,943,074 and 2,857,360, which are incorporated by reference, contain additional information as to the preparation of these materials. A preferred material is described in U.S. Pat. No. 2,943,074, column 4, preparation "D" and converted to emulsified polymer "B" as described therein.

The manner of forming the polymer composition is not critical. Preferably, each component is added as a part of a premix, the latter being passed through an extruder with extrusion temperature being maintained between about 450° and 640° F., dependent upon the composition. The strands emerging from the extruder may be cooled, chopped into pellets, re-extruded, or molded to a desired shape.

The concentration of the flame retardant combination (b) and (c) in the total composition is not critical and is dependent to a large extent upon the concentration of resinous components and their particular nature. Obviously, lower concentrations of resins will require a lower concentration of the flame retardant, and easy experimentation will suffice. However, in general, an effective concentration of the flame retardant combination will comprise, e.g., from 10 to 40 parts per 100 parts of composition generally being acceptable and between 15 and 35 parts being preferred. The concentration of the phosphate (b) relative to the concentration of the aromatic halogen compound (c) may be as low as 1:5, however, ratios of 5:5 to 15:5 aromatic phosphate to aromatic halogen being preferred.

The concentration of impact modifier (d) can also vary over wide limits. However, the lowest concentration needed for any desired impact strength will be economically the best choice. By way of illustration, good results will be secured with from about 3 to about 25 parts of component (d) for every 100 parts by weight of (a), (b), (c) and (d) combined, with preferred contents ranging from about 3 to about 10 parts by weight by (d), same basis.

DESCRIPTION OF THE PREFERRED EMBODIMENTS

The following example illustrates compositions of the present invention. It is illustrative and is not to be construed as limiting the claims thereto. All amounts indicated are in parts by weight.

EXAMPLE

The thermoplastic composition is made by premixing the ingredients and then extruding in a 28 mm. twin screw extruder at a temperature of 500° F., re-extruding, then chopping into pellets. The pellets are molded into test pieces in a 3 oz. Newbury injection molding machine at 515° F. (cylinder) and 190° F. (mold). For comparison purposes, two other compositions, one without aromatic halogen component (c) and one without aromatic phosphate component (b) are prepared, the latter using a low rubber content modified polystyrene instead of impact modifier (d). The molded articles are tested for physical properties and behavior in small- and large-scale burning tests. The results are set forth in the Table:

Table

| Compositions Comprising Polyphenylene Ehter, Aromatic Phosphate, Aromatic Halogen Compound and Impact Modifier | | | |
| --- | --- | --- | --- |
| Example | 1 | 1A* | 1B* |
| Composition (parts by weight) | | | |
| Poly(2,6-dimethyl-1,4-phenylene ether | 80 | 80 | 35 |
| High impact polystyrene[a] | — | — | 65 |
| A-B-A block copolymer[b] | 5 | 5 | — |
| triphenyl phosphate | 18 | 20 | — |
| decabromodiphenyl oxide | 10 | — | 12 |
| antimony oxide | — | — | 4 |
| *Control | | | |
| [a]Foster Grant HIPS | | | |
| [b]Kraton 1101 SBS Shell Polymers | | | |
| tridecyl phosphite | 0.5 | 0.5 | 0.5 |
| polyethylene | 1.5 | 1.5 | 1.5 |
| zinc sulfide | 0.15 | 0.15 | 0.15 |
| zinc oxide | 0.15 | 0.15 | 0.15 |
| titania pigment | 3.0 | 3.0 | 3.0 |
| carbon black | 0.1 | 0.1 | 0.1 |
| Properties | | | |
| Heat deflection temp., 266 psi., ° F. | 214 | 220 | 231 |
| Elongation, % | 69 | 91 | 54 |
| Tensile strength, psi | 10,800 | 9,700 | 8,100 |
| Tensile yield, psi. | 11,800 | 9,800 | 8,700 |
| Gardner impact strength, in.-lbs. | 230 | 290 | 90 |
| Small Scale Burn Test | | | |
| Rating from UL 94 procedure (1/16") | V-O | V-O | V-O |
| Large Scale Burn Test Results[c] | | | |
| Time for plastic to ignite (min.) | 2–3 | 3 | 2–3 |
| Degree of combustion | Incomplete | Complete | Complete |
| Character of smoke evolved | Yellowish-grey; fine particles, optical density low enough to permit some retention of visibility. | Same as 1 | Dense, black, curdy, totally obscuring visibility. |
| [c]Brady-Williamson Corner Test. Reference, G.L. Nelson et al, Technical Article, March 25, 1976, "Full Scale Testing of Engineering Plastics." | | | |
| Dripping | No flaming drips | Flaming drips | Flaming drips |
| Max temps. (° C.) at | | | |
| ceiling | 342 | 912 | 1060 |
| 6 ft. level | 210 | 623 | 731 |
| 4 ft. level | 116 | 390 | 311 |
| 2 ft level | 126 | 226 | 149 |
| Time to max (min.) | 8 | 9 | 7 |

It is noteworthy that all three compositions would be classified as V-O (excellent) in the small scale test. On the other hand, only the composition of this invention was superior in the large scale test.

It should be understood that various changes and modifications may be made in the embodiments described herein without departing from the scope of the invention as defined by the following claims. For example, the compositions of this invention are typically admixed with other additives such as pigments, plasticizers, fillers, stabilizers, lubricants and the like.

We claim:

1. A flame retardant, impact resistant thermoplastic composition comprising
   (a) a polyphenylene ether resin;
   (b) an aromatic phosphate, aromatic phosphonate or aromatic phosphine oxide compound;
   (c) an aromatic halogen compound; and
   (d) an impact modifier comprising an elastomeric A-B-A or A-B block copolymer wherein A comprises a polymerized vinyl aromatic compound and B comprises a polymerized diene hydrocarbon, not including hydrogenated derivatives thereof, components (b) and (c) being present in an amount at least sufficient to render said composition flame retardant, and component (d) being present in an amount at least sufficient to improve the impact resistance of articles molded from said composition.

2. A composition as defined in claim 1 wherein the polyphenylene ether is present in an amount of from 50 to 95 parts per 100 parts by weight of the compositions and is of formula:

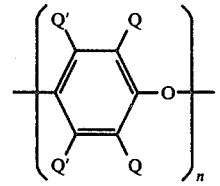

wherein the oxygen ether atom of one unit is connected to the benzene nucleus of the next adjoining unit; n is a positive integer equal to at least 50; and each Q and Q' is a monovalent substituent selected from hydrogen, halogen, hydrocarbon radicals free of a tertiary alpha-carbon atom, halohydrocarbon radicals having at least two carbon atoms between the halogen atom and phenyl nucleus and being free of a tertiary-alpha-carbon atom, hydrocarbonoxy radicals being free of a tertiary-alpha-carbon atoms, or halohydrocarbonoxy radicals having at least two carbon atoms between the halogen atom and phenyl nucleus and being free of tertiary-alpha-carbon atom.

3. A composition as defined in claim 2 wherein each Q is lower alkyl and each Q' is hydrogen.

4. A composition as defined in claim 1 wherein the phosphate component (b) is of the formula:

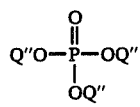

where each Q'' is individually selected from the group of hydrogen and hydrocarbon radicals provided that at least one Q'' is aryl.

5. A composition as defined in claim 1 wherein the aromatic halogen component (c) is a halogenated aromatic ring compound having at least two halogen atoms.

6. A composition as defined in claim 5 wherein the aromatic halogen component (c) is a polyhalobenzene.

7. A composition as defined in claim 1 wherein the aromatic halogen component is a biphenyl having at least two halogen atoms per aromatic ring.

8. A composition as defined in claim 7 wherein the halogen atoms are chlorine.

9. A composition as defined in claim 7 wherein the halogen atoms are bromine.

10. A composition as defined in claim 1 wherein the aromatic halogen component has two phenyl radicals joined by a bivalent radical and each phenyl radical has at least two halogen atoms substituted thereon.

11. A composition as defined in claim 10 wherein the bivalent radical is alkylene and the halogen atoms are chlorine.

12. A composition as defined in claim 10 wherein the bivalent radical is alkylene and the halogen atoms are bromine.

13. A composition as defined in claim 10 wherein the bivalent radical is oxygen and the halogen atoms are chlorine.

14. A composition as defined in claim 10 wherein the bivalent radical is oxygen and the halogen atoms are bromine.

15. A composition as defined in claim 4 wherein each Q'' is phenyl.

16. A composition as defined in claim 1 wherein component (d) comprises polymerized styrene and polymerized butadiene.

17. A composition as defined in claim 1 wherein component (a) comprises poly(2,6-dimethyl-1,4-phenylene) ether; component (b) comprises triphenyl phosphate; component (c) comprises decabromodiphenyl oxide; and compound (d) comprises an A-B-A block copolymer including polystyrene terminal blocks and polybutadiene center blocks.

* * * * *

UNITED STATES PATENT AND TRADEMARK OFFICE
CERTIFICATE OF CORRECTION

PATENT NO. : 4,191,685

DATED : March 4, 1980

INVENTOR(S) : William Robert Haaf et al

It is certified that error appears in the above-identified patent and that said Letters Patent are hereby corrected as shown below:

In Col. 1, line 39, "atoms" should read -- atom --.

In Col. 4, line 58, "2,2bis-" should read -- 2,2-bis- --.

In Col. 8, line 7, "methacylate" should read -- methacrylate --.

In Col. 9, line 36, "Ehter" should read -- Ether --.

Signed and Sealed this

Twenty-fifth Day of November 1980

[SEAL]

Attest:

SIDNEY A. DIAMOND

Attesting Officer

Commissioner of Patents and Trademarks